(12) United States Patent
Klein et al.

(10) Patent No.: US 7,908,223 B2
(45) Date of Patent: Mar. 15, 2011

(54) SYSTEM AND METHOD FOR CONDUCTING SECURE TRANSACTIONS

(75) Inventors: Amit Klein, Herzliya (IL); Ronen Heled, Kiryat-Ono (IL)

(73) Assignee: EMC Corporation, Hopkinton, MA (US)

( * ) Notice: Subject to any disclaimer, the term of this patent is extended or adjusted under 35 U.S.C. 154(b) by 480 days.

(21) Appl. No.: 11/527,539

(22) Filed: Sep. 27, 2006

(65) Prior Publication Data

US 2007/0069008 A1    Mar. 29, 2007

Related U.S. Application Data

(60) Provisional application No. 60/720,492, filed on Sep. 27, 2005.

(51) Int. Cl.
*G06Q 20/00* (2006.01)

(52) U.S. Cl. ............................................. 705/75; 726/28

(58) Field of Classification Search ................ 705/75; 726/28

See application file for complete search history.

(56) References Cited

U.S. PATENT DOCUMENTS

| | | | |
|---|---|---|---|
| 6,195,698 B1 * | 2/2001 | Lillibridge et al. ............ | 709/225 |
| 7,149,899 B2 * | 12/2006 | Pinkas et al. ................... | 713/182 |
| 7,200,576 B2 * | 4/2007 | Steeves et al. .................. | 705/64 |
| 7,219,368 B2 * | 5/2007 | Juels et al. ........................ | 726/2 |
| 7,360,091 B2 * | 4/2008 | Aikawa et al. ................. | 713/172 |
| 7,487,130 B2 * | 2/2009 | Steele et al. ..................... | 705/75 |
| 2004/0073813 A1 * | 4/2004 | Pinkas et al. ................... | 713/202 |
| 2005/0229251 A1 * | 10/2005 | Chellapilla et al. ............. | 726/23 |
| 2007/0174628 A1 * | 7/2007 | Charrette et al. .............. | 713/182 |

OTHER PUBLICATIONS

CAPTCHA. Wikipedia. Retrieved from the Internet on Jun. 1, 2010. Retrieved from <http://en.wikipedia.org/wiki/Captcha>.*
Adrian Masood, "15 Seconds: Fighting Spambots with .NET and AI", Internet Citation, Feb. 2, 2004, XP002343808.
Menazes et al.. "Handbook of Applied Cryptography, Challenge-Response Identification (Strong Authentication)", Handbook of Applied Cryptography, CRC Press Series on Discrete Mathematics and Its Applications. Boca Raton, FL, CRC Press, US, 1997, pp. 397-404, 490, XP002282273.
International Search Repot for International Application No. PCT/IL2006/001125 mailed Mar. 14, 2007.

* cited by examiner

*Primary Examiner* — Andrew J. Fischer
*Assistant Examiner* — Jamie Kucab
(74) *Attorney, Agent, or Firm* — Pearl Cohen Zedek Latzer, LLP

(57) ABSTRACT

A system and method of conducting a transaction comprising accepting transaction information from a user, producing a customized statement, the customized statement relating to at least a portion of the transaction information and including a challenge to the user, and sending the user an obscured representation of the customized statement. The system and method may accept from the user a response to the challenge. The system and method may further allow the transaction to proceed if the response is correct and prevent the transaction from proceeding if the response is incorrect.

12 Claims, 3 Drawing Sheets

SYSTEM AND METHOD FOR CONDUCTING SECURE TRANSACTIONS

RELATED APPLICATION DATA

The present application claims benefit from prior U.S. Provisional Patent Application Ser. No. 60/720,492, filed on Sep. 27, 2005, entitled "System and Method for Validating Online Transaction", the entire contents of which are incorporated herein by reference.

FIELD OF THE INVENTION

Embodiments of the present invention relate generally to security mechanisms for conducting secure transactions over a potentially non-secure channel, such as the Internet.

BACKGROUND

Sophisticated hacking systems threaten current security mechanisms for conducting transactions over non-secure channels. Crimeware such as a Trojan Horse, may intercept the transfer of data, modify it, and/or cause the data to be sent to a user that is not the identified user, for example, a hacker or hacking system. Such interceptions may be, for example, the result of transaction injection attacks or transaction substitution attacks. Known security mechanisms that provide for authentication of user identity (e.g., one- or two-factor authentication) may not solve such problems and others. A need therefore exists to develop more effective security mechanisms for conducting secure transactions.

SUMMARY OF THE INVENTION

Embodiments of the invention may provide a system and method for conducting transactions including accepting transaction information from a user, producing a customized statement, and sending a user an obscured representation of the customized statement. In some embodiments, the customized statement may relate to at least a portion of the transaction information and/or may include a challenge to a user. In some embodiments, the customized statement may be obscured or distorted in such a manner as make it difficult for crimeware to decipher or interpret and respond.

BRIEF DESCRIPTION OF THE DRAWINGS

The invention, both as to organization and method of operation, together with objects, features and advantages thereof, may best be understood by reference to the following detailed description of embodiments of the invention when read with the accompanied drawings in which.

Figure 1:
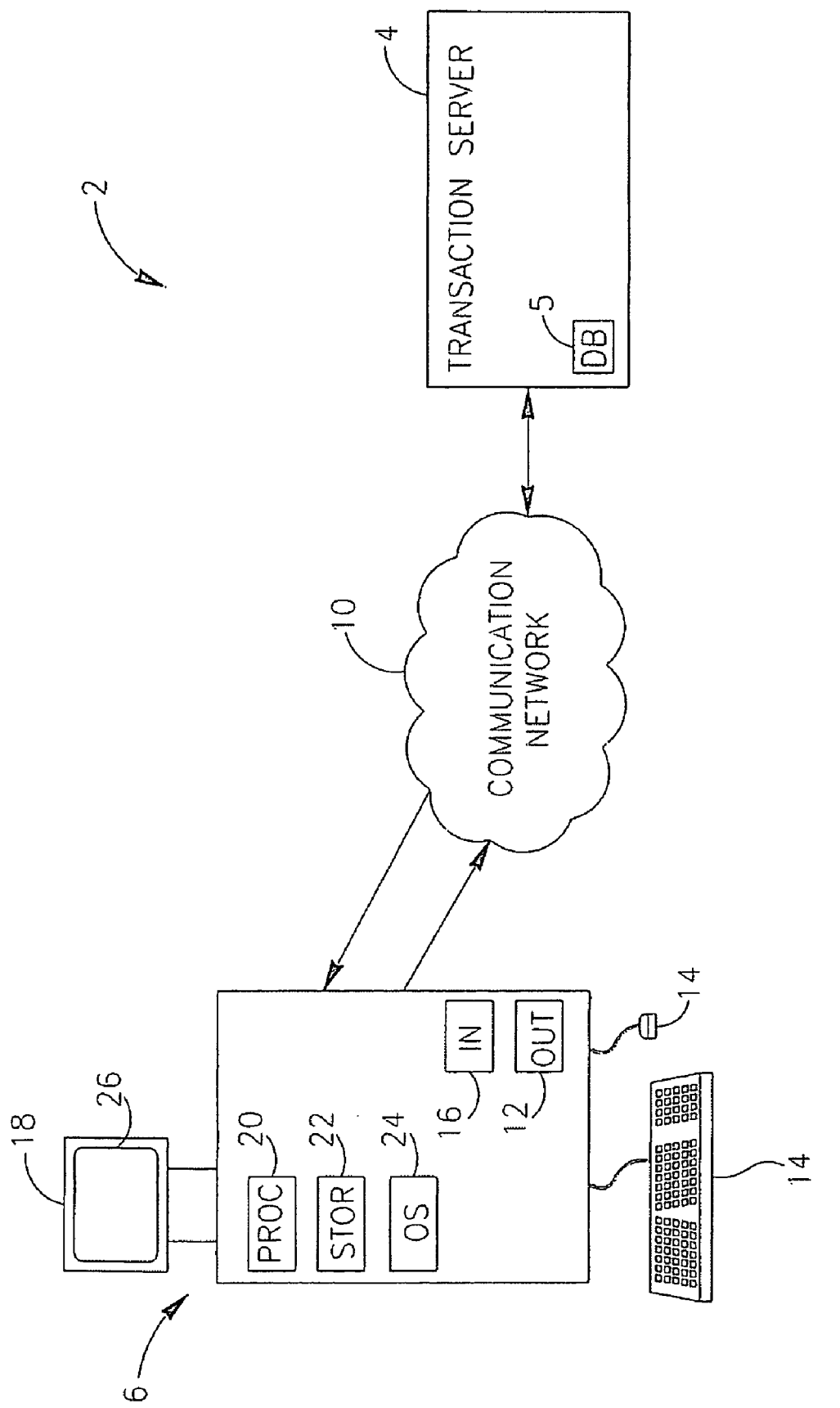
FIG. 1 is a schematic illustration of a transaction system for conducting secure transactions, in accordance with an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

The processes presented herein are not inherently related to any particular computer or other apparatus. Various general-purpose systems may be used with programs in accordance with the teachings herein, or it may prove convenient to construct a more specialized apparatus to perform embodiments of a method according to embodiments of the present invention. Embodiments of a structure for a variety of these systems appear from the description herein. In addition, embodiments of the present invention are not described with reference to any particular programming language. It will be appreciated that a variety of programming languages may be used to implement the teachings of the invention as described herein.

Unless specifically stated otherwise, as apparent from the discussions herein, it is appreciated that throughout the specification discussions utilizing data processing or manipulation terms such as "processing", "computing", "calculating", "determining", or the like, typically refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the invention may provide a system and method for conducting secure or confidential transactions over non-secure channels, for example, bank websites. Transactions may include, for example, the transfer of information, currency, goods, rights to services, etc. Embodiments of the invention may provide a system and method for securely verifying the authenticity of users communicating over non-secure channels and/or the details of a desired transaction, while reducing the risk of interception, substitution and/or modification of sensitive or confidential information. A channel, for example, may refer to any pathway used to convey information from a transmitter to a receiver. It will be understood that while the discussion centers around non-secure channels, embodiments of the present invention may be implemented over secure channels as well as non-secure channels.

FIG. 1 schematically illustrates a transaction system 2 for conducting secure transactions, in accordance with an embodiment of the invention. Transaction system 2 may include a transaction server 4 for executing remote transactions, a device 6, for example, for a user to communicate with transaction server 4 for conducting transaction.

Transaction server 4 may communicate with device 6 over communication networks 10, such as the Internet and/or other networks. Transaction server 4 may generate and support client side interfaces, for example, via a website, using a GUI 26, for example, for supporting online communications. Such communication may or may not be secure.

Device 6 may include an output unit 12 and an input unit 16 for communicating with transaction server 4. The user may provide personal information and/or access information to transaction server 4, using output unit 12 and input unit 16. Data sent by transaction server 4 to device 6, for example, over communications network 10, may be displayed and accessed by users using client side interfaces on a display 18. Data accepted by transaction server 4 from device 6 may be provided by users by entering information, for example, using controls 14, into the client side interface. Controls 14 may include, for example, a keyboard, a mouse, a touch-pad, a scanner or a transmitter such as the mouthpiece of a telephone handset. Display 18 may include, for example, a monitor, a printer or a receiver such as the earpiece of a telephone handset.

A non-exhaustive list of examples of device 6 includes a computing system, such as a personal computer, a desktop computer, a mobile computer, a laptop computer, a notebook computer, a terminal, a workstation, a server computer, a Personal Digital Assistant (PDA) device, a tablet computer, a network device, or a network, a telephone or telephone system, or the like. Devices 6 may further include, for example, a processor 20, a storage unit 22, and an operating system 24. Device 6 may be implemented using any suitable combination of hardware components and/or software components.

Processor 20 may include, for example, a Central Processing Unit (CPU), a Digital Signal Processor (DSP), one or more controllers, or any suitable specific and/or general and/or multi-purpose processor or micro-processor or controller. Database 5 and storage unit 22 may include memory units, for example, for storing Random Access Memory (RAM), Read Only Memory (ROM), Dynamic RAM (DRAM), or other suitable memory systems. Operating system 24 may include, for example, Microsoft Windows, Linux, Unix, Apple OS, Solaris, Sun-OS, HP-UX, or other suitable operating systems. It is noted that device 6, output unit 12, input unit 16, controls 14, display 18, processor 20, storage unit 22, and/or operating system 24 may include other suitable components and/or implementations as is known in the art.

Transaction server 4 may accept a one or a number of sets of identification information, and/or one or a set of transaction information, for example, provided by a user. Identification information may include partial or complete details for identifying a user, for example, a user name, a password, a name of a first grade teacher, and/or the last four numbers of a user's account, etc. For example, identification information may include one- or two-factor authentication. Some forms of identification information may be provided by users, for example, by possessing a hardware token, or smart card, or by entering appropriate codes, user names, passwords, serial numbers or any other suitable forms of identification information, into the client side interfaces or by other suitable actions.

Transaction information may specify partial or complete transaction details for conducting a desired transaction, for example, an amount of money, a source and/or destination for the money, identified by name, account number, or otherwise. For example, "transfer $100.00 to Account Number XXXXX123" includes transaction information.

Transaction server 4, such as a bank website server, may accept and/or verify the identification information and/or transaction information provided by a user. In one embodiment, transaction server 4 may store user identification and transaction information, for example, for example, in database 5, to be used, for example, for bank records or conducting a transaction using the information at a later time. Access to database 5 may be protected by security mechanisms, as is known in the art.

In some embodiments, the transaction information may be sent over a potentially non-secure channel. There may be concern that communication between the user and transaction server 4 may be intercepted and possibly corrupted, for example, by hackers and/or hacking software or systems. Thus, for example, crimeware located or installed between the user, including on the user's computer, and the transaction server, may intercept the communication, modify it, particularly transaction details, and have the falsified transaction executed. In such case, the user may not known that the transaction information has been modified.

According to embodiments of the invention, transaction server 4 may send a user a customized statement that in some embodiments recites, incorporates or otherwise confirms at least a portion of the transaction information. The statement may be, include or otherwise be associated with a challenge. In order to execute the desired transaction, transaction server 4 may require that the user provides a correct response to the challenge, thereby indicating confirmation of the transaction information.

Figure 3A:
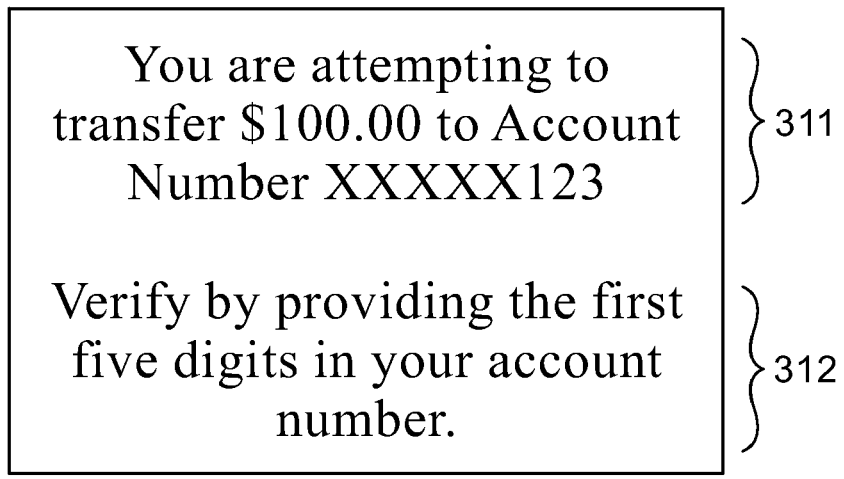
FIGS. 3A and 3B are schematic depictions of examples of representations of a customized statement in accordance with embodiments of the present invention.

The challenge may include a customized statement that includes at least a portion of the transaction information for verification by the user's correct response to the challenge. In some embodiments, the challenge may draw upon personal or confidential identity information, such that substantially only the identified user may correctly respond. In some embodiments, such a challenge may include full or partial transaction information and/or a derivation, categorization or rearrangement thereof. For example, as depicted in FIG. 3A, the customized statement 310 may include alphanumeric characters comprising at least a portion of the transaction information 311 and a challenge 312, such as, "You are attempting to transfer $100.00 to Account Number XXXXX123. Verify by providing the first five digits in your account number". In some embodiments, the customized statement used may be selected randomly from among a plurality of suitable challenges so that a correct response may not be predicted by a hacker or hacking system. For example, the challenge may randomly select a number of digits from an account number, or the placement of the required digits in the account number may be randomly selected. Additionally or alternatively, the challenge may call for a randomly selected challenge pertaining to the transaction information. Selecting randomly may include selecting according to a suitable randomization algorithm.

In some embodiments of the invention, the challenge may be designed so that substantially only a human user may be capable of comprehending, perceiving, reading, hearing, deciphering, or otherwise being able to answer the question. In some embodiments, the challenge may require personal information; in some embodiments, the challenge may require transaction information; in some embodiments, the challenge may display transaction information for confirmation by the user. Completion of the transaction may require the user to provide the correct response to the challenge.

According to embodiments of the invention, the customized statement, including, for example, transaction information for verification and/or the challenge itself may be presented to the user on a suitable display in an obscured fashion, so that substantially only a human may be capable of readily recognizing it. Thus, for example, in the event that crimeware has intercepted and modified the user's requested transaction, e.g., by altering the recipient account or the transaction amount, it may also attempt to intercept a request for confirmation of the falsified transaction and present it to the user modified to reflect the original desired transaction, leading the user to believe he is confining the original recipient account, while in reality, lie is confirming the falsified transaction. This obfuscation of the customized statement and/or the challenge may be calculated to prevent the crimeware from intercepting and/or modifying confirmation of the transaction information. Additionally or alternately, the obfuscation may be used to obscure the randomly selected challenge, such that crimeware cannot answer the challenge on behalf of the user. Obscuring the customized statement may include any manipulation of the information, for example, such that substantially only a human may readily recognize. Since an automated hacker or hacking system may not readily recognize the obscured customized statement, the hacker or hacking system may not recognize the challenge, or may be likely to provide an incorrect response. Transaction server 4 may identify the incorrect response and may for example halt the transaction.

Figure 3B:
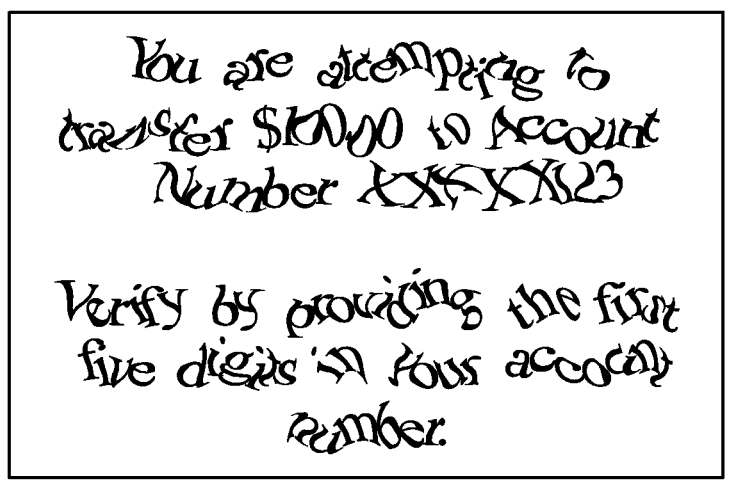

Various mechanisms may be used to reduce the likelihood that crimeware intercepting the challenge may be able to decipher the challenge, answer the challenge and/or modify the challenge so as to fool the user into confirming a falsified transaction. One embodiment of the invention may utilize a reverse Turing test, for example, the Completely Automated Public Turing test to tell Computers and Humans Apart ("CAPTCHA"™). For example, the customized statement may comprise a challenge, which may include image data comprising distorted data embedded therein, where the distorted data relates to transaction information provided by an identified user and/or the challenge to be answered in order to confirm the transaction. For example, as depicted in FIG. 3B, the distorted data may depict a distorted image representation of the customized statement 320, which may for example, include text or alphanumeric characters comprising at least a portion of the transaction information 321 and a challenge 322, such as, "You are attempting to transfer $100.00 to Account Number XXXXX123. Verify by providing the first five digits in your account number". Another mechanism may be an audio distortion of the customized statement.

Transaction server 4 may accept a response to the distorted data provided by a user, for example, via output unit 12. In some embodiments, transaction server 4 may generate a correct response to the challenge to determine if the response provided by the user is correct. The correct response may be substantially accurate, for example, known to be correct or verified by the identified user. For example, transaction server 4 may compare the generated correct response with the response provided by the user. If the responses sufficiently match, transaction server 4 may execute the desired transaction. If the responses do not sufficiently match, the transaction server may not conduct the desired transaction and may execute additional security or anti-fraud measures, for example, investigating the identity of the user that provided the incorrect response, notifying the account owner, requesting that the user telephone the service provider, or halting subsequent transactions from the account or from the user's computer until a lifting mechanism resets the account to secure levels.

In some embodiments, the correct response may include transaction information, or a derivation thereof, that substantially only the identified user may be capable of providing. In embodiments where partial transaction information is initially provided, the correct response may include the remainder of the transaction information necessary to specify and/or conduct the desired transaction. For example, in reference to an example above, transaction information may only partially specify the identified user's account number, for example, "Account Number XXXXX123". A correct response may include the remaining first five digits of the account number. In one embodiment, transaction server 4 may have access to bank account records and may compare the first five digits provided in the response, to the first five digits of the appropriate account number accessed from the identified user's bank records. In other embodiments, transaction server 4 need not have access to the identified user's bank account records. For example, transaction server 4 may attempt to execute the desired transaction according to the transaction information provided by the user in response to the challenge. A successful attempt may indicate that the transaction information is correct. and thus, transaction server 4 may execute the desired transaction. Accordingly, a failed attempt to execute the desired transaction may indicate that the transaction information is incorrect and transaction server 4 may halt the transaction and execute further security mechanisms, as is known in the art.

In other embodiments, if the transaction information initially provided by the identified user is fully complete, the correct response may include a reiteration of some or all of the complete transaction information. Transaction server 4 may compare the transaction information provided in the response with the initially provided transaction information to determine whether or not transaction information provided in the response is correct.

Figure 2:
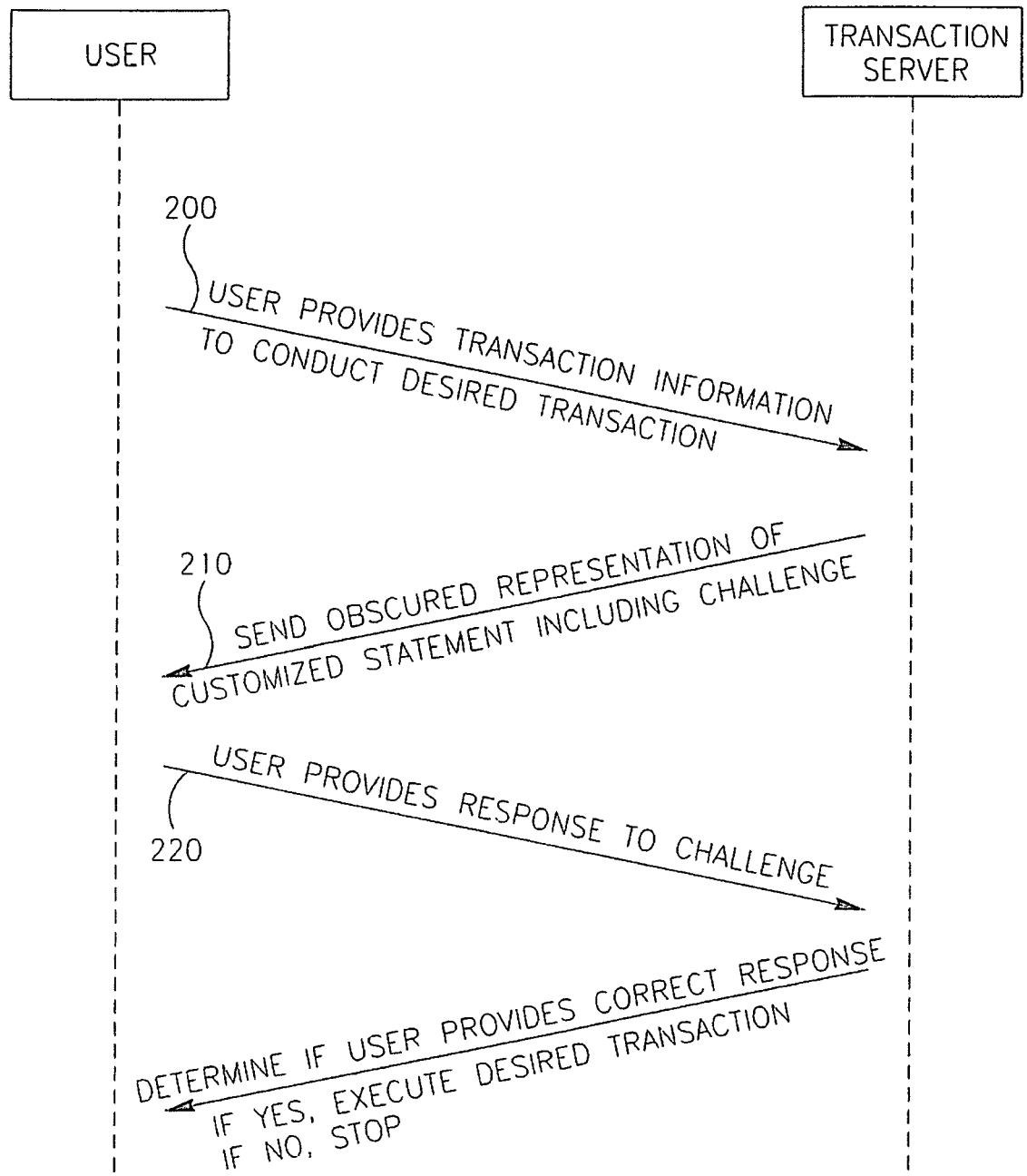
FIG. 2 is a flowchart of a method for conducting secure transactions according to embodiments of the present invention.

Reference is made to FIG. 2, which is a schematic illustration of a flowchart of a method for conducting secure transactions according to an embodiment of the present invention.

In operation 200, a user may attempt to conduct a desired transaction. The user may provide transaction information that specifies a desired transaction. A transaction server, for example, transaction server 4, such as a bank website server, may accept the transaction information. Transaction information may include, for example, partial or complete transaction details for conducting a desired transaction, for example, an amount of money, a source and/or destination for the money, an account number, etc. For example, "transfer $100.00 to Account Number XXXXX123".

Since the transaction information may be sent over a non-secure channel, communication between the user and the transaction server may be intercepted and possibly corrupted, for example, by hackers and/or hacking systems. Thus further verification of user identity is needed to ensure the desired transaction is securely executed for the identified user in operation 200.

In operation 210, the transaction server may use the transaction information to send a user a representation of a customized statement. The representation of the customized statement may be in a form difficult for crimeware to decode, for example, as a graphic image, or as an audible statement to be heard at the user's end. For example, the customized statement may be converted into image form and sent as a GIF or JPG file for presentation at the user end. In an embodiment of the invention, the representation may be converted into an audible form and sent as a WAV file for presentation at the user end, for example, on speakers associated with the user's computer. In such cases, the user may be asked if he has speakers, and/or may be prompted to activate the volume on the speakers. The customized statement may relate to the transaction information and may include a challenge to a user. The representation, whether audible or visual, may be obscured. For example, the obscured representation may include image data including distorted data embedded therein, where the distorted data may relate to the transaction information provided by the identified user in operation 200.

The customized statement may be designed so that a correct response is in agreement with the desired transaction information. In some embodiments, since the correct response may be in agreement with the transaction information, if crimeware were to modify the transaction information, the response would be incorrect and the transaction would be blocked. Thus, an intercepting party may not modify the transaction information.

For example, the customized statement may include a challenge that requires a response that reiterates the desired transaction information in order to execute a transaction. For example, the customized statement may state, "You are attempting to transfer $100.00 to Account Number XXXXX123. Verify by providing the name of your first grade teacher". The transaction server may generate a correct response to the challenge, for example, by retrieving information, for example, the 'name of a first grade teacher' provided by the user in operation 200.

In operation 220, a user may provide a response to the customized statement.

In operation 230, the transaction server may determine whether or not the response provided by the user in operation 220 is correct. For example, the transaction server may determine whether or not the response sufficiently matches the correct response generated by the transaction server. If the responses sufficiently match, the transaction server may conduct the transaction according to the transaction information provided by the user in operation 200. If the responses do not sufficiently match, the transaction server may not conduct the transaction according to the transaction information provided by the user in operation 200 and may additionally execute security measures, for example, investigating the identity of the user in operation 220 or halting subsequent mechanisms according to embodiments of the invention for the user in operation 220.

It will be appreciated by persons skilled in the art that the present invention is not limited to what has been particularly shown and described hereinabove. Rather the scope of the present invention is defined only by the claims, which follow:

What is claimed is:

1. A method for processing a transaction by a transaction server computer, the method comprising:
   accepting at a transaction server computer transaction information from a user over a computer network, wherein said transaction information consists essentially of a transaction amount, a source of said transaction amount, and an intended destination of said transaction amount;
   producing a customized statement, said customized statement including at least a portion of said transaction information and a challenge to said user based on said transaction information;
   sending to a computing device associated with said user an obscured image representation of the customized statement for presentation to said user;
   accepting from said computing device associated with said user a response to said challenge;
   determining by said transaction server computer whether said response correctly responds to the challenge; and
   in response to said response correctly responding to the challenge, processing by said transaction server computer a transaction based on said transaction information.

2. The method of claim 1, wherein the obscured representation is generated according to a reverse Turing test mechanism.

3. The method of claim 1, comprising selecting the customized statement from a set of customized statements.

4. The method of claim 1, comprising selecting the customized statement according to a randomization algorithm.

5. The method of claim 1, wherein sending said representation of the customized statement comprises sending said representation to the computing device associated with the user over the Internet.

6. The method of claim 1, wherein determining whether said response correctly responds to the challenge includes determining whether said response includes at least said portion of said transaction information.

7. A system for processing a transaction, the system comprising:
   a transaction server computer configured to:
      accept transaction information from a user over a computer network, wherein said transaction information consists essentially of a transaction amount, a source of said transaction amount, and an intended destination of said transaction amount,
      produce a customized statement, said customized statement including at least a portion of said transaction information and a challenge to said user based on said transaction information,
      send to a computing device associated with said user a distorted image representation of the customized statement for presentation to said user;
      accept from said computing device associated with said user a response to said challenge;
      determine whether said response correctly responds to the challenge; and
      process a transaction based on said transaction information if said response correctly responds to the challenge.

8. The system of claim 7, wherein the distorted image is generated according to a reverse Turing test mechanism.

9. The system of claim 7, wherein the transaction server computer is to randomly select the challenge from a set of possible challenges.

10. The system of claim 7, further including a network for transmitting transaction information between the user and the transaction server.

11. The system of claim 10, wherein the network is the Internet.

12. The system of claim 7, wherein said transaction server computer is configured to determine whether said response is a correct response to the challenge by determining whether said response includes at least said portion of the transaction information.

* * * * *